Oct. 3, 1933.   O. U. ZERK   1,928,920
UNIVERSAL JOINT
Filed May 4, 1932
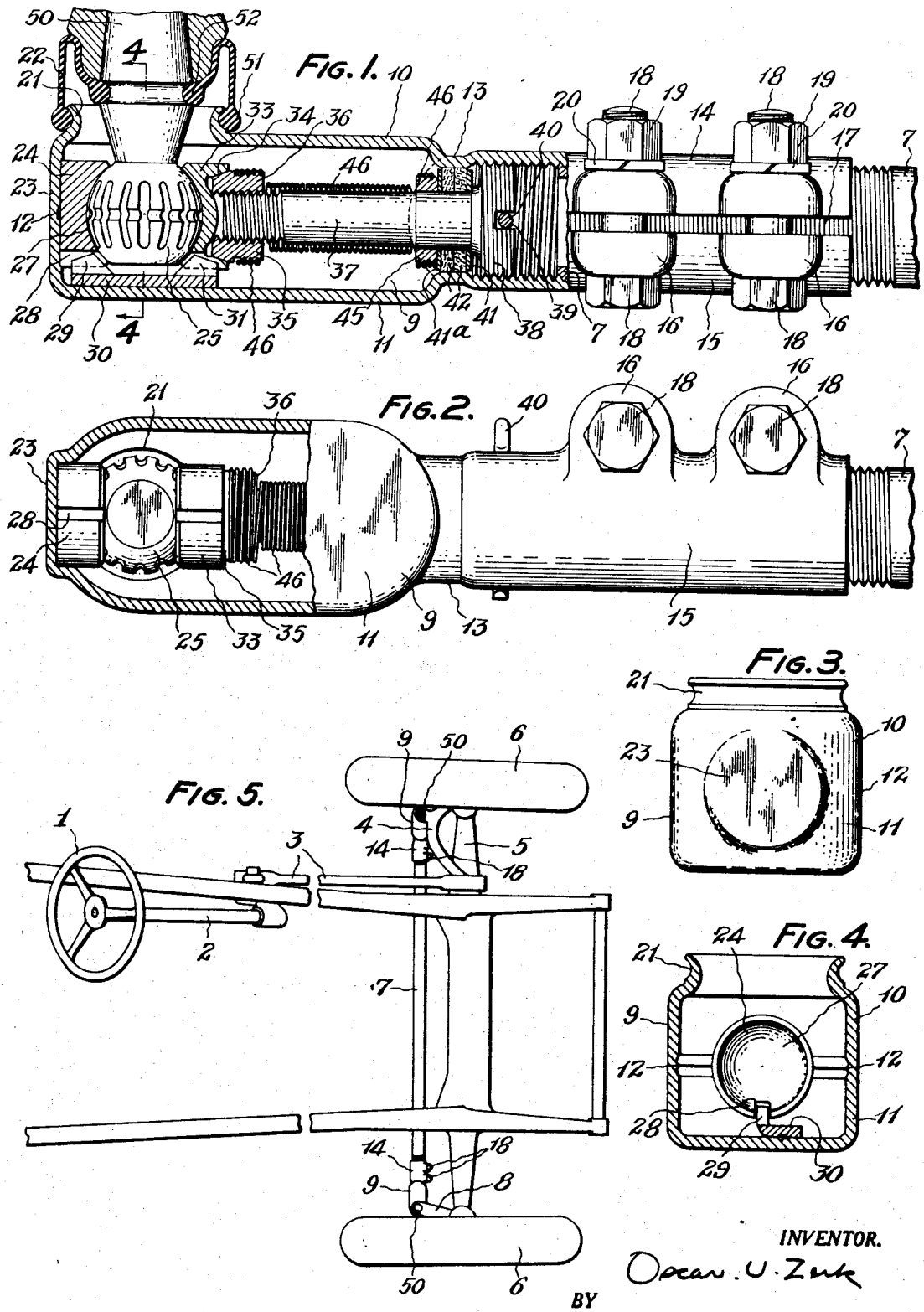
INVENTOR.
Oscar. U. Zerk
BY
Slough + Canfield
ATTORNEYS.

Patented Oct. 3, 1933

1,928,920

UNITED STATES PATENT OFFICE 1,928,920

UNIVERSAL JOINT

Oscar U. Zerk, Chicago, Ill.

Application May 4, 1932. Serial No. 609,174

10 Claims. (Cl. 287—90)

My invention relates generally to universal joints and relates more particularly to universal joints commonly employed on tie rods, drag links, shock absorbers, and like parts of automobiles.

It is desirable in such universal joints which are usually of the ball and socket type, that wear and lost motion due to wear between the joint be prevented so far as possible. I accomplish this result by providing a ball and socket engaging element maintained in continuous pressure relation and automatically adjustable to compensate for any wear which may occur between the joint elements, and to reduce the wear to the minimum.

I preferably provide a relatively large enclosing casing adapted to have a joint element or elements projected therefrom and effectively sealed against the escape or egress of lubricant therefrom whereby an initial supply of lubricant may suffice for the entire life of the joint.

It is an object of my invention therefore to provide an improved universal joint.

Another object of my invention is to provide an improved universal joint wherein wear occurring between the joint elements is automatically compensated.

Another object of my invention is to provide an improved universal joint wherein wear occurring between the joint elements is compensated for concurrently with the occurrence thereof.

Another object of my invention is to provide an improved universal joint adapted to be effectively sealed against the escape of lubricant initially supplied thereto.

Another object of my invention is to provide an improved universal joint having parts which are susceptible of formation by relatively inexpensive stamping and screw machine operations.

Another object of my invention is to provide an improved universal joint which is easily and efficiently assembled.

Another object of my invention is to provide an improved universal joint sealingly enclosed in a casing possessing a maximum of strength for a minimum of weight.

Another object of my invention is to provide an improved universal joint sealingly enclosed in a relatively large chamber by a casing having adjustable clamping means associated therewith.

These and other objects of the invention will become more apparent from a consideration of the following description and drawing wherein like references indicate like parts, and wherein, Fig. 1 is a view partially in vertical medial section and partially in elevation of the embodiments of my invention;

Fig. 2 is a bottom elevational view of the embodiment illustrated in Fig. 1 with the joint casing partially broken away;

Fig. 3 is an end elevational view of the embodiments of my invention illustrated in Figs. 1 and 2;

Fig. 4 is a section taken along the lines 4—4 of Fig. 1 with the ball element removed; and Fig. 5 is a view of a conventional steering mechanism of a vehicle employing my invention.

Referring to the drawing:—

At 1 I show a steering wheel rigidly connected to a steering post 2, adapted through suitable linkage to actuate a drag link 3 in a generally forwardly or rearwardly direction relative to the vehicle. The drag link 3 is connected to a steering arm 4 integral with a steering knuckle rotatably engaging an axle 5 provided with a spindle upon which wheels 6 are mounted.

The steering arm 4 is connected to a tie rod 7 which at its opposite end engages an arm 8 integral with a conventional steering knuckle previously described.

Inasmuch as it is desirable for reasons well understood in the art that the wheels 6 be cambered relative to the axle 5, the arm 4 as it moves radially of the axle end supporting the steering knuckle will not move in a strictly horizontal plane but will move somewhat in a vertical direction. The end of drag link 3 which is connected with the steering arm 4 will thus necessarily move in more than one plane and consequently a universal joint is required at this point. In the same manner the tie rod 7 which is connected to the steering arm 4 and also the arm 8 will move both transversely of the vehicle and at the same time upwardly or downwardly thus requiring a universal joint at the point to which the tie rod is connected to the arms 4 and 8.

These joints are subjected to considerable usage with the result that considerable play and back-lash occur in the mechanism. Back-lash and play cause inability to properly control a moving vehicle, and increased derangement or breakage of associated parts which is particularly to be avoided in the steering apparatus of vehicles.

The tie rod 7 is removably and adjustably secured to a ball joint casing 9 more fully shown and described in my copending application, Serial No. 604,781, filed April 12, 1932.

The casing 9 is formed by disposing two generally similar preferably sheet metal cup-shaped sections 10 and 11 confrontingly together and integrally uniting the sections, preferably by welding along the abutting edges as indicated at 12. The sections 10 and 11 are provided with reduced generally cylindrical portions adapted to form a throat 13 in the casing after assembly, and are further provided with generally semi-cylindrical interiorly threaded clamping jaws 14 and 15, respectively, the jaws 14 and 15 having integral therewith lugs 16 disposed on either side of a longitudinally extending slot 17 intermediate the clamping jaws.

The lugs 16 are adapted to constrictingly draw the jaws 14 and 15 together by means of bolts 18 disposed in aligned apertures provided therein, and nuts 19. Lock washers 20 are preferably provided intermediate the lugs and nuts 19 to insure that the bolts will remain locked in any desired position.

The section 10 has the top wall thereof flared outwardly to form a circular collar 21 provided with an external groove adapted to form a seat for one end of a closure element 22 to be hereinafter described.

The end wall of the casing 9 is pressed outwardly and generally circularly, as indicated at 23, to form a seat for a shoe 24 adapted to engage the ball 25 of the joint ball element. After butt-welding the sections 10 and 11 together, and prior to assembly of the joint elements therein, a reamer or other suitable tool is inserted between the jaws 14 and 15 and machines the inner wall of seat 23 to remove any flash created during the welding process, and also machines the inner wall of throat 13 for the same reason.

The shoe 24, which is preferably circular in cross-section, is provided with a planar face which seats upon the portion 23 of the end wall, and an inner face 27 recessed concentric to the ball 25 of the ball element. The lower portion of said shoe 24 is slotted as indicated at 28, and adapted to loosely engage an upstanding ear 29 of a plate 30 rigidly secured to the base of the section 11, preferably by welding. The ear 29 thus prevents movement of the shoe 24 transversely of the casing 9, and preferably loosely engages the shoe 24 so that a slight inaccuracy during the welding process will have no tendency to cause a binding action therebetween. A similar upstanding ear 31 integral with the plate 30 engages and acts as a guide for an oppositely disposed shoe 33, and limits transverse movement thereof in a manner similar to that previously described in connection with the shoe 24.

The inner face of shoe 33 is recessed concentric with the ball 25 of the ball element, and the outer face is provided with a frusto-conical recess 34, the walls of which are adapted to engage a supporting nut 35. The nut 35 is provided with a reduced externally threaded portion 36.

The nut 35 threadedly engages an end of a bolt 37, the head 38 of which threadedly engages the inner walls of the jaws 14 and 15. The head 38 of bolt 37 is preferably slotted, as indicated at 39, the slot performing a dual function of effecting a means of rotating the bolt 37 and also of locking the bolt relative to the clamping jaws by means of a cotter key or the like 40, disposed in the slot, and also engaging aligned apertures provided therefor in the clamping jaws. Adjacent the head 38, the bolt 37 is provided with a shoulder adapted to provide an abutting surface for a preferably sheet metal washer 41 which encircles the bolt and at its opposite face engages a packing ring 42 which encircles the bolt 37, and engages the inner wall of throat 13. A second washer 41a pressively engages a second packing ring 42, thus insuring an effective seal to be maintained between the chamber enclosing the joint element and the clamping jaws.

A threaded ring 45 is slidingly disposed over a bolt 37 and is externally threaded to engage several convolutions of a spring 46, the opposite end of which is secured to nut 35 through several convolutions thereof engaging the externally threaded portion 36 of the nut. The spring 46 is reduced substantially in diameter intermediate the ring 45 and nut 35, the constricting force of the spring convolutions being sufficient to hold the spring and the nut in non-rotative relationship therewith. Also, by having several convolutions engage the spring or the nut, the torsional effect imparted as one is turned relatively to the other will thus tend to be equally distributed to the nut or ring, rather than eccentrically imparted thereto as would be the case if the spring ends were affixed to the ring or the nut at one definite point.

In this manner any tendency of the nut 35 to bind on the bolt 37 due to an eccentric thrust imparted thereto is prevented, and the nut will be freely rotatable relative to the bolt. Since the spring 46 is normally loaded or under stress, it will keep the ring 45 tightly pressed against washer 41a thus insuring that the packing element 42 will always be under sufficient compression to effectively seal the throat 13 of the casing.

As wear occurs between the shoes and the ball element, play will occur therebetween and will permit the torsional spring 46 to rotate the nuts 35 slightly, since the friction between the shoe 33 and the nut 35 will be removed due to the play created by the wearing action of the joint element. The shoe 33 will thus be forced forwardly into contact with ball 25, thus providing an automatic means to compensate for wear between the joint elements and to insure that no back-lash or play will exist therebetween.

I have found by experiment that it is imperative that a relatively greater frictional force exist between nut 35 and shoe 33 than between nut 35 and bolt 37. The bolt and nut, together with the intermediate encircling element, are pre-assembled and then inserted between the clamping jaws with the head 38 of the bolt threadedly engaging the inner walls of the jaws. To load the spring, the bolt 37 is screwed inwardly towards the joint end of the casing and it is necessary that the friction between the nut and the shoe be greater than between the nut and screw, as otherwise binding will occur between the nut and the screw during the loading operation of the spring.

Prior to inserting the screw and nut assembly into the casing, the spring is not under tension; the friction between the nut and shoe 33 will obviously be relatively less than between the nut and bolt 37, and consequently the nut 35 will tend to rotate with the bolt, and the extraordinary amount of friction created between the nut and the bolt due to the combined turning and simultaneous forward movement would render it extremely difficult to move the bolt forward into its final position and thus tighten the torsional spring. When the friction between the shoe and the nut is relatively greater than between the nut and the bolt, the nut will be relatively rigid and cannot turn and bind, and due to the relatively rigid condition of the nut the bolt in turning and moving forward will be able to be screwed into the nut without any appreciable amount of friction.

Also, since the forward movement of the bolt is regulated by the pitch of the threads on the bolt head 38, it is important that the pitch of the threads at the bolt ends be substantially the same. Thus, the forward movement of the bolt 37 relative to the casing will be substantially the same as the forward movement relative to the nut 35, provided the nut remains rigid, and the loading effect on the spring can be easily gauged.

To insure that there will be sufficient friction between the shoe 33 and nut 35, I provide a frusto-conical recess within the shoe 33 adapted to engage a complementary portion of the nut 35 and thus create a relatively large amount of friction between these two members. However, to guard against a binding action therebetween the included angle should not extend beyond a minimum below which binding might occur.

To insure that the shoes engaging the ball 25 may be self-centering, a small amount of clearance is provided between the male thread at the end of bolt 37 and a female thread on the nut 35, thus permitting sufficient movement of the nut and the engaged shoe 33 to permit self-centering thereof. Although the shoe 33 is prevented from rotating relative to the casing by the upstanding ear 31, it is able to move longitudinally and slightly laterally thereof, thus aiding in any self-centering tendency of the shoe.

The construction described requires only two openings, the vertical opening through which the shank 50 of the ball element is projected, and the lateral opening through which the shoe 33 and the nuts and bolt assembly are inserted. This lateral opening as previously described is effectively sealed against the ingress of foreign material or against the escape of lubricant if it is desired to use the casing as a lubricant reservoir, and to provide an effective seal therebetween I preferably employ a closure element 22 more fully shown and described in my copending application, Serial No. 609,176, filed May 4, 1932, which is relatively pervious to the action of oils and gasoline.

The closure element 22 comprises a ring 51 which sealingly and constrictingly engages the collar 21 of the casing 9 and a relatively smaller ring 52 which constrictingly and sealingly engages a groove provided therefor in the shank 50, the two rings being joined by a relatively thin flexible wall bent re-entrantly back upon itself as shown in Fig. 1. The wall preferably increases in thickness from ring 51 to ring 52 so that the torsional resistance to twisting of the two wall sections will be substantially the same.

It is understood that various mechanical arrangements can be substituted for the screw and bolt wear compensating means, such as an eccentric, a cam, single or double levers, or a toggle arrangement automatically controlled. I contemplate that various such arrangements disposed externally of the ball engaging shoe and within the casing may be employed.

I have shown and described an embodiment of my invention, but I also contemplate that numerous and extensive departures may be made therefrom without departing from the spirit and scope of my invention, and the appended claims.

Having thus described my invention, what I claim is:—

1. The combination of a casing, a ball and socket joint disposed within the said casing, said joint comprising at least one movable socket element engageable with the ball element of said joint, means to automatically compensate for wear occurring between the joint elements comprising a bolt rigidly affixed to the casing, a nut threadedly engaging the said bolt and abutting a socket element, and spring means to resiliently urge the nut against the socket element whereby the socket element will be maintained in firm bearing contact with the ball element, to compensate for wear in the joint.

2. A universal joint mechanism comprising a casing, a ball element having the ball portion thereof projected through the casing, shoes engaging the said ball element and at least one of the said shoes engaging the casing wall, automatic means to compensate for wear occurring between the ball and shoes comprising a bolt rigidly affixed in the casing, a tapered nut engaging the said bolt and adapted to resiliently engage a complementary shaped recess in one of the said shoes, spring means adapted to move the said nut axially of the said bolt while maintaining a relatively greater frictional force between the nut and the shoes than the nut and the bolt.

3. A universal joint mechanism comprising a casing, a ball and shoe joint within the said casing, automatic means adapted to compensate for wear occurring between the ball and shoe, said means comprising a bolt rigidly affixed within the casing, a nut threadedly engaging the said bolt, a spring resiliently rotatively urging the nut against the shoe, and a head on the bolt engaging the said casing.

4. The universal joint mechanism substantially as described in claim 3, characterized by the said bolt head threadedly engaging the casing.

5. A universal joint mechanism, comprising a casing, a ball and shoe joint disposed within the said casing, clamping means integral with the said casing and adapted to constrictingly engage a tie rod or the like, automatic means adapted to compensate for wear occurring between the joint element, said means comprising a bolt having a head portion threadedly engaging the casing at the clamping means, a nut threadedly engaging the said bolt and spring means intermediate the said bolt and nut adapted to resiliently maintain the said nut in engaged relation with the shoe element.

6. The universal joint mechanism substantially as described in claim 5, characterized by providing a slight clearance intermediate the threads of the bolt head and the casing whereby rotation therebetween may be effected to permit the shoe to center relative to the ball element of the joint.

7. A universal joint mechanism, comprising a casing, a ball element disposed in the casing, oppositely disposed shoes engaging the ball element, means adapted to compensate for wear occurring between the said ball and shoes comprising a bolt provided with a threaded head, said casing comprising a threaded tubular portion making threaded engagement with said head, and means for mutually locking said threaded head and casing together in predetermined rotational positions of said head relative to said casing threaded portion, a nut threadedly engaging the shank of the bolt, a torsion spring adapted to relatively rotate the nut and the bolt, the threads on the bolt shank and the bolt head being of substantially the same pitch, the said nut being adapted to engage one of the said shoes during the assembly operation whereby the bolt will be rotated relative to the nut thus compressing the spring.

8. The combination of a casing, a ball and socket joint disposed within the said casing, said joint comprising at least one movable socket element engageable with the ball element of said joint, means to automatically compensate for wear occurring between the joint elements comprising a bolt rigidly affixed to the casing, a nut threadedly engaging the said bolt and abutting a socket element, and spring means to resiliently urge the nut against the socket element whereby the socket element will be maintained in firm bearing contact with the ball element, to compensate for wear in the joint, said nut being loosely journaled on the threaded portion of said bolt to permit a slight variation from axial alignment between said nut and said bolt.

9. The combination of a casing, a ball and socket joint disposed within the said casing, said joint comprising at least one movable socket element engageable with the ball element of said joint, means to automatically compensate for wear occurring between the joint elements comprising a bolt rigidly affixed to the casing, a nut threadedly engaging the said bolt and abutting a socket element, and spring means to resiliently urge the nut against the socket element whereby the socket element will be maintained in firm bearing contact with the ball element, to compensate for wear in the joint, the contacting surfaces of said nut and socket element relative to the contacting surfaces of said nut and bolt being so formed that the resistance to relative rotation of said nut and socket element will be greater than between said nut and bolt.

10. The combination of a casing, a ball and socket joint disposed within the said casing, said joint comprising at least one movable socket element engageable with the ball element of said joint, means to automatically compensate for wear occurring between the joint elements comprising a bolt rigidly affixed to the casing, a nut threadedly engaging the said bolt and abutting a socket element, and spring means to resiliently urge the nut against the socket element whereby the socket element will be maintained in firm bearing contact with the ball element, to compensate for wear in the joint, guides rigidly fixed to said casing for restraining said socket element against lateral displacement relative to said ball element, said socket element being loosely fitted within said guides to permit slight centering lateral movement of said socket element relative to said ball element.

OSCAR U. ZERK.